United States Patent
Wu et al.

(10) Patent No.: US 11,423,635 B2
(45) Date of Patent: Aug. 23, 2022

(54) METHOD FOR PROCESSING IMAGE USING FULLY CONNECTED CONVOLUTIONAL NEURAL NETWORK AND CIRCUIT SYSTEM

(71) Applicant: REALTEK SEMICONDUCTOR CORP., Hsinchu (TW)

(72) Inventors: Chun-Chang Wu, Taichung (TW); Shih-Tse Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 16/876,294

(22) Filed: May 18, 2020

(65) Prior Publication Data

US 2021/0042560 A1 Feb. 11, 2021

(30) Foreign Application Priority Data

Aug. 7, 2019 (TW) .................. 108128101

(51) Int. Cl.
*G06V 10/44* (2022.01)
*G06K 9/62* (2022.01)
(Continued)

(52) U.S. Cl.
CPC ......... *G06V 10/454* (2022.01); *G06K 9/6217* (2013.01); *G06K 9/6267* (2013.01);
(Continued)

(58) Field of Classification Search
CPC .. G06K 9/4628; G06K 9/6217; G06K 9/6267; G06T 3/4046; G06T 7/60; G06T 2207/20084
(Continued)

(56) References Cited

U.S. PATENT DOCUMENTS

2018/0240249 A1 * 8/2018 Uchigaito .......... G06K 9/00805

FOREIGN PATENT DOCUMENTS

| CN | 104700118 A | 6/2015 |
| CN | 105447190 A | 3/2016 |

OTHER PUBLICATIONS

Sharma "A Comprehensive Tutorial to learn Convolutional Neural Networks from Scratch", deeplearning.ai 2018 (Year: 2018).*
(Continued)

*Primary Examiner* — Mark Roz
(74) *Attorney, Agent, or Firm* — Li & Cai Intellectual Property (USA) Office (57) ABSTRACT

A method for processing image using fully connected convolutional neural network and a circuit system are provided. The method is operated using fully connected convolutional neural network (CNN) and performed by the circuit system. In the method, an image with a length, a width and an aspect ratio is obtained. A reference image closest to the input image can be obtained by querying a lookup table that records multiple reference images with various sizes to be adapted to the fully connected CNN. The input image can be resized as the closest reference image. A convolution operation is then performed onto the resized image, and a feature cube is formed after multiple operations of convolution. The feature cube is transformed to one-dimensional feature values that are configured to be inputted to a fully connected layer for fully connected operation. An output value of the fully connected CNN is generated.

17 Claims, 7 Drawing Sheets

(51) Int. Cl.
*G06T 3/40* (2006.01)
*G06T 7/60* (2017.01)

(52) U.S. Cl.
CPC .............. *G06T 3/4046* (2013.01); *G06T 7/60* (2013.01); *G06T 2207/20084* (2013.01)

(58) Field of Classification Search
USPC ........................................................ 385/156
See application file for complete search history.

(56) References Cited

OTHER PUBLICATIONS

Karen Simonyan; Andrew Zisserman. "Very Deep Convolutional Networks for Large-Scale Mage Recognition." Conference paper at ICLR 2015.
Christian Szegedy; Wei Liu; Yangqing Jia; Pierre Sermanet; Scott Reed; Dragomir Anguelov Dumitru Erhan; Vincent Vanhoucke; Andrew Rabinovich. "Going deeper with convolutions."
Christian Szegedy; Vincent Vanhoucke; Sergey Ioffe; Jonathon Shlens; Zbigniew Wojna. "Rethinking the Inception Architecture for Computer Vision."
Christian Szegedy; Sergey Ioffe; Vincent Vanhoucke; Alex Alemi. "Inception-v4, Inception-ResNet and the Impact of Residual Connections on Learning."
Joseph Redmon; Ali Farhadi. "YOLO9000: Better, Faster, Stronger."
Kaiming He; Xiangyu Zhang; Shaoqing Ren; Jian Sun. "Spatial Pyramid Pooling in Deep Convolutional Networks for Visual Recognition."

* cited by examiner

METHOD FOR PROCESSING IMAGE USING FULLY CONNECTED CONVOLUTIONAL NEURAL NETWORK AND CIRCUIT SYSTEM

CROSS-REFERENCE TO RELATED PATENT APPLICATION

This application claims the benefit of priority to Taiwan Patent Application No. 108128101, filed on Aug. 7, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure is related to an image-processing technology using convolutional neural network, and more particularly to an image-processing method using fully connected convolutional neural network that can maintain the property of an original image without limiting the image size, and a circuit system.

BACKGROUND OF THE DISCLOSURE

A machine learning technology is generally applied to a field of Artificial Intelligence (AI). A process of machine learning is based on an algorithm that is performed to learn the features in big data. A model can be established for determining or predicting the real world.

The algorithm used in the machine learning process is such as a convolutional neural network (CNN). CNN is a kind of feedforward neural network that can be used in a field of image processing. A deep learning method in the process is used to identify an image, detect an object and segment an image.

The CNN-implemented deep learning method is one of the methods for machine learning in the field of artificial intelligence. For operating the deep learning, a standard convolutional neural network includes a fully connected layer. In practice, the conventional CNN requires the input images with the same aspect ratio of length and width since the size of input image is restricted. Therefore, the conventional method simply scales the lengths and widths of the original images to a fixed size.

Figure 1:
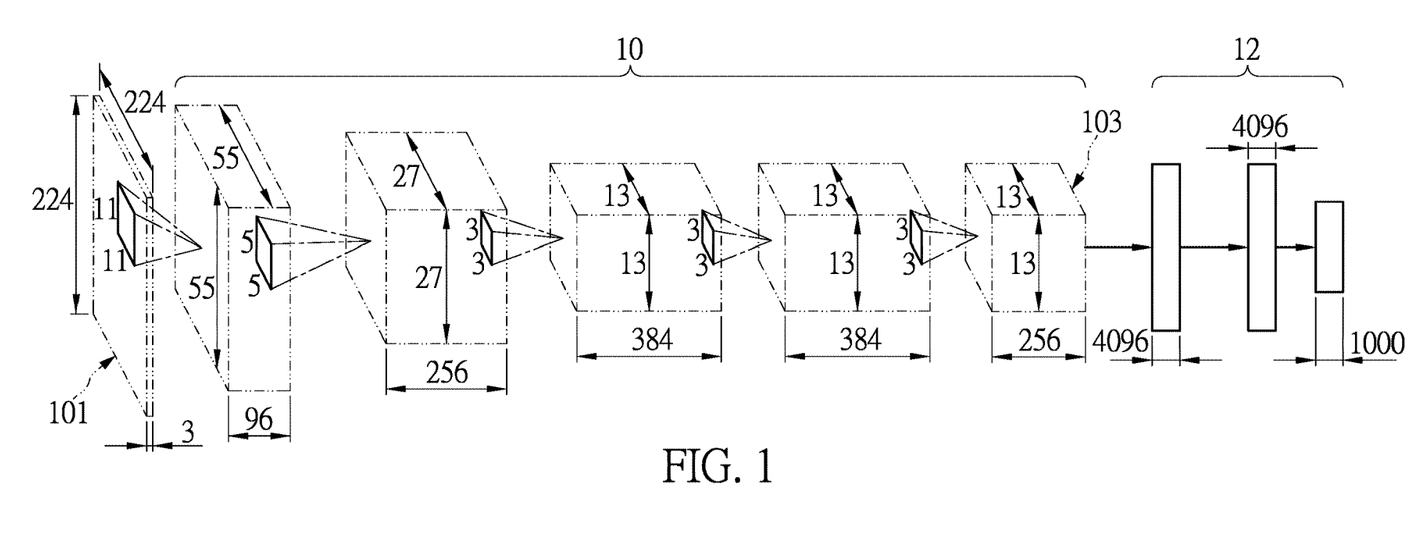
FIG. 1 is a schematic diagram depicting a framework of a conventional convolutional neural network.
Figure 2:
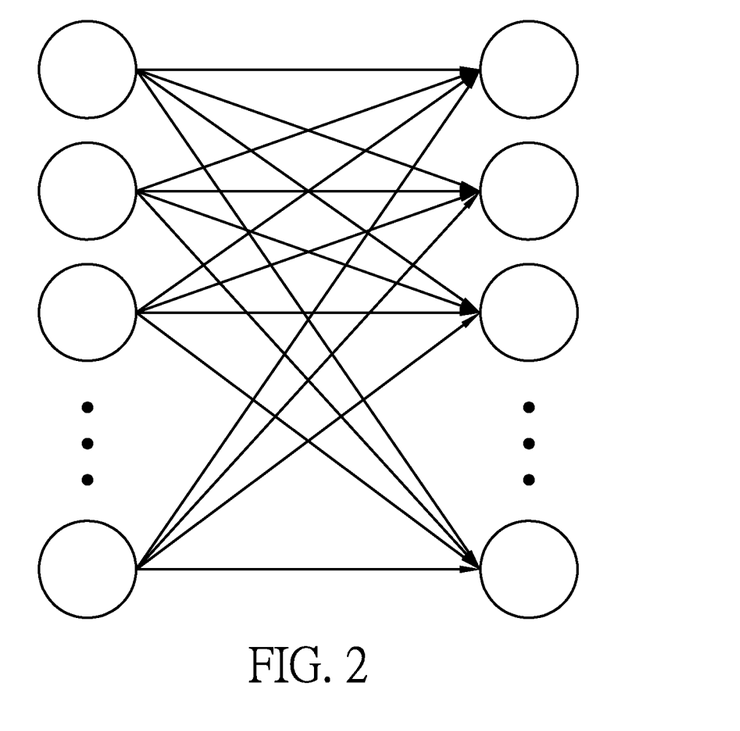
FIG. 2 is a schematic diagram depicting a conventional fully connected operation.

A framework of a standard convolutional neural network can be referred to in FIG. 1. The framework includes two parts, in which a front half part indicates a convolution operation 10 and a back half part indicates a fully connected operation 12 or what is called a dense operation. The fully connected operation is schematically shown in FIG. 2. In view of the fully connected operation 12 shown in FIG. 1, there are 4096 neurons on the left and 4096 neurons on the right. The left neurons and the right neurons are interconnected and also multiplied by weights. There are 4096×4096 lines in total. In FIG. 1, the size of an original image 101 is 224×224×3. The size of the original image 101 is transformed to 55×55×96, 27×27×256, 13×13×384, 13×13×384, and a last cube 103 with a size of 13×13×256 by some convolution operations. The last size 13×13×256 is pulled to a one-dimensional vector for a first fully connected operation. The one-dimensional vector has 43264 values that are processed with the later 4096 values by a fully connected layer.

Under this conventional model, the operation meets an error at the first fully connected layer since the length and width of the image are not fixed. For example, the output result may be 15×15×256 or 17×17×256 via the convolution operation if the image becomes larger. It is impossible to train a fixed network since the number of weights at the fully connected layer is different.

The conventional algorithm used in the machine learning is such as VGG, which is a Very Deep Convolutional Networks for Large-Scale Image Recognition or GoogLeNet, that compels the input image to be resized to a fixed length and a fixed width. However, the resized image may lose its original geometric characteristics.

Another conventional method such as Darknet19 in the machine learning is erasing the fully connected layer and switching to a Fully Convolution Network (FCN). This method allows the input images to have different lengths and widths since it erases the fully connected layer; however, the computation for convolution operation may be increased, the frame rate may be reduced, and the advantage and characteristics of fully connected layer are also lost.

SUMMARY OF THE DISCLOSURE

The disclosure is related to a method for image processing using a fully connected convolutional neural network, and a circuitry system for implementing the method. The method provides a solution that is able to be applied to a conventional neural network model for processing an image without limiting the input size and still retaining its original geometric characteristics.

In one embodiment of the disclosure, in the method, an image is firstly received and matches one of preset sizes of reference images adapted to a fully connected convolutional neural network. A convolution operation is then operated on the image. A feature cube is formed after multiple convolution operations. The feature cube is converted to a one-dimensional feature value that is inputted to a fully connected layer. A fully connected operation is performed in the fully connected layer for generating an output value of the fully connected convolutional neural network.

Further, the feature cube includes image features extracted from the image, and an activation function is performed on the image features for obtaining shape features of one or more objects in the image. One or more feature maps can be formed after performing a convolution operation. A pooling operation is performed to reduce dimensionality and the important information of the image can still be retained.

Preferably, the output value of the fully connected convolutional neural network can be used to identify or classify the image.

In one further embodiment of the disclosure, in the method, an image is also received. A length, a width and an aspect ratio of the image are obtained. After querying a lookup table that is established by a plurality of sizes of reference images adapted to the fully connected convolutional neural network, a reference image closest to the length, the width and the aspect ratio of the received image are obtained. The input image is then resized to meet the size of the reference image. The aspect ratio of the input image is kept as original as possible. After multiple convolution operations, a feature cube is formed. The feature cube is converted to a one-dimensional feature value. The one-dimensional feature value is inputted to the fully connected layer for performing a fully connected operation. An output value of the fully connected convolutional neural network is generated.

The circuit system for implementing the method includes one or more processors and a memory. The one or more processors perform the method for image processing using the fully connected convolutional neural network.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Since a convolutional neural network (CNN) has great achievements in the applications of image recognition, more methods for image processing based on the technology of convolutional neural network have been developed. However, in the process of image processing such as image recognition or classification, an input image for the conventional CNN is required to have fixed length and width if the model of convolutional neural network includes a fully connected layer. Thus, the operation of CNN may have an error at a first fully connected layer if the length and width of the input image are not fixed. Further, a fixed network cannot be trained if the number of weights at the fully connected layer is not fixed.

The regular images are mostly rectangles including the rectangles with larger aspect ratio, e.g., 16:10, 16:9 or much larger ratio. The objects in the image may lose their original geometric characteristics if the image is resized to the same aspect ratio of length and width with requirement of the convolutional neural network, and accordingly the objects in the resized image may not be recognized correctly. For example, the objects in the image such as people, vehicles, or home appliances may not be recognized correctly since their aspect ratios in the image are changed based on the requirement of the conventional CNN. Thus, the conventional CNN with the fully connected layer that requires the same aspect ratio of the image is unable to satisfy practical needs.

In view of the drawbacks of the conventional CNN with the fully connected, a method for image processing using a fully connected convolutional neural network and a circuit system are provided in the disclosure. One of the objectives of the method and the circuit system is to retain an original aspect ratio of an input image for training a model rather than fixing the same aspect ratio of the image. Further, the method for image processing using the fully connected convolutional neural network can be adapted to any known CNN framework. The method allows the CNN to accept images with different aspect ratios of lengths and widths, even though the CNN originally required the input images to have the same aspect ratio.

Figure 3:
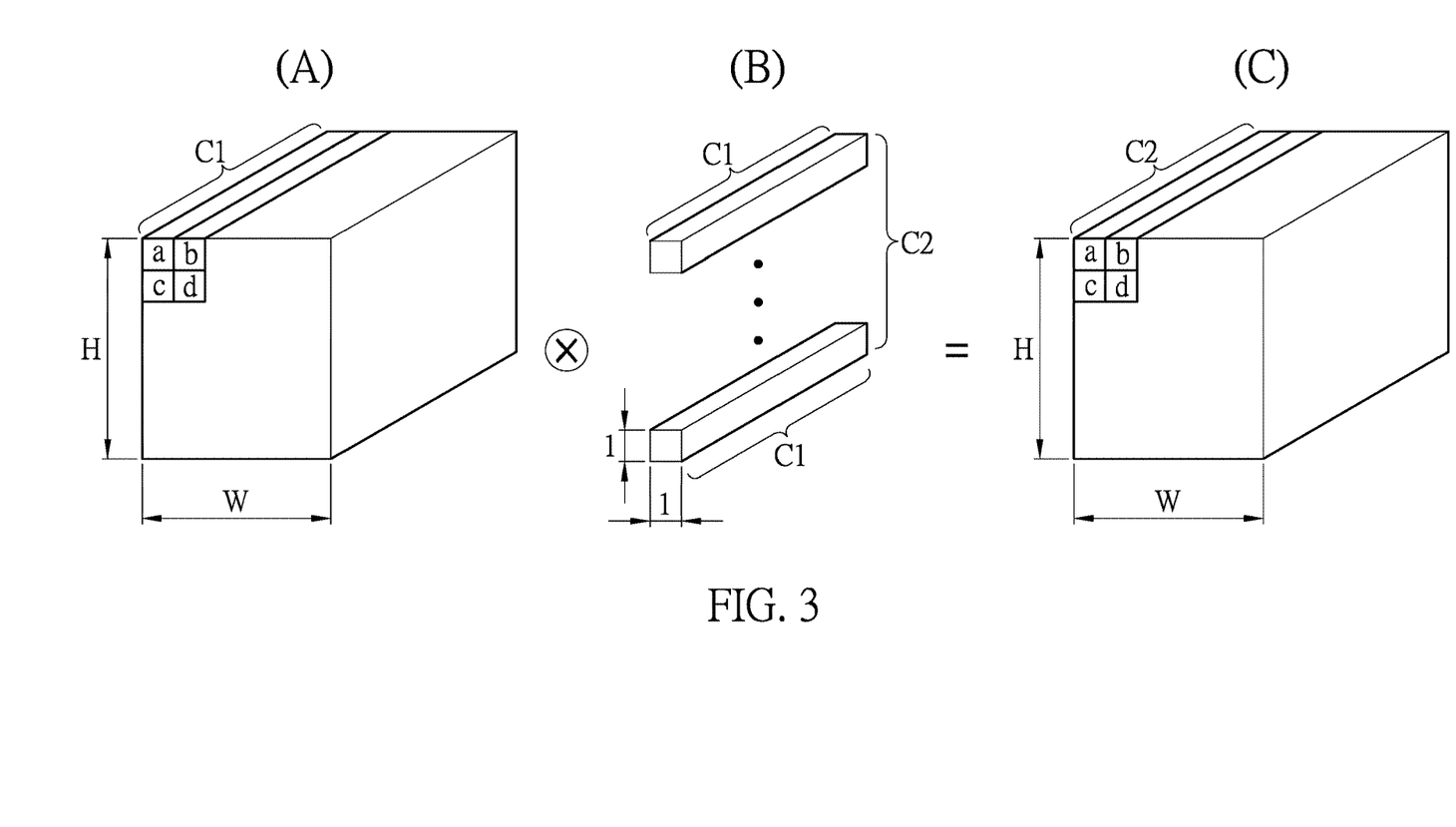
FIG. 3 is a schematic diagram depicting a pointwise convolution operation 的.

Reference is made to FIG. 3 that schematically depicts a convolution operation in one embodiment of the disclosure.

FIG. 3A shows an input layer of a pointwise convolution operation. The input layer is such as an input image data. A cube is used to depict the input layer. The labels 'a', 'b', 'c' and 'd' in the cube denote input values in a first layer. The input values can be pixel values of an input image. The input layer indicates a cube with a length 'H', a width 'W' and a depth 'C1'. The depth 'C1' represents a first number C1 of a convolution core of the input layer. For the input image, 'H' and 'W' denote a length and a width of the input image, and number of 'C1' can be 3, which indicates three primary color channels red, green and blue.

FIG. 3B is a schematic diagram that shows a 1*1 filter implemented by the convolution core. In the present example, there are a second number C2 of filters. The convolution operation uses the filter to one-by-one scan and calculate a previous input layer (FIG. 1A), using a moving window according to a stride setting. In the process of convolution operation, the calculation includes operations of a multiplication and an addition performed on the values. An output value of the calculation is such as an outcome shown in FIG. 3C.

An input layer shown in FIG. 3C shows an output layer represented as a cube with a length 'H' a width 'W' and a depth 'C2'. The depth 'C2' denotes the feature maps corresponding to the same number (the second number C2) of the filters. The output value is shown as the feature maps. The present example shows a number H*W*C2 of the output values.

The convolution core implements a filtering mechanism. In FIG. 3B, every parameter of the convolution core corresponds to a weighting parameter of a neural network. The convolution cores link with the corresponding pixels. The moving window is used in the convolution operation for performing one-by-one scan and calculation that performs multiplication operation of the parameters and the corresponding pixel values, and then performs addition thereof. A result for convolution operation can be obtained. It should be noted that the convolution core can be used to retrieve features in the image and perform feature mapping.

In an exemplary example, a convolution operation is performed on an input image and a filter, as shown in FIG. 3B, in which a 1*1 filter with a depth 3, i.e. the first number C1, is used for multiplying the input image. A feature map is then outputted, and the feature map is an output value with a size of 'H*W*1'. Similarly, when a second number C2 of filters are used, as shown in FIG. 3B, a second number C2 of feature maps are obtained. A cube shown in FIG. 3C is obtained after combining the second number C2 of feature maps. In other words, the output layer, as shown in FIG. 3C, can be obtained when the convolution operation is performed on the input data, e.g., the input image, and the filters. An output value with size of 'H*W*C2' can be obtained after combining the output layers.

In the convolution operation, a number, i.e. the second number C2 shown in FIG. 3B, of filters are used. The filter is implemented by a convolution core, and each of the filters has a first number C1 of values. FIG. 3B shows that every filter has a first number C1, e.g., 3, of values that are individually multiplied with the same number of values at every position of the input data. A sum of the values obtained by the multiplication operation is then calculated. The second number C2 of filters become the second number C2 of feature maps through the convolution operation. In FIG. 3C, the feature maps with a size of H*W*C2 are outputted and as an output value of the convolution operation.

Figure 4:
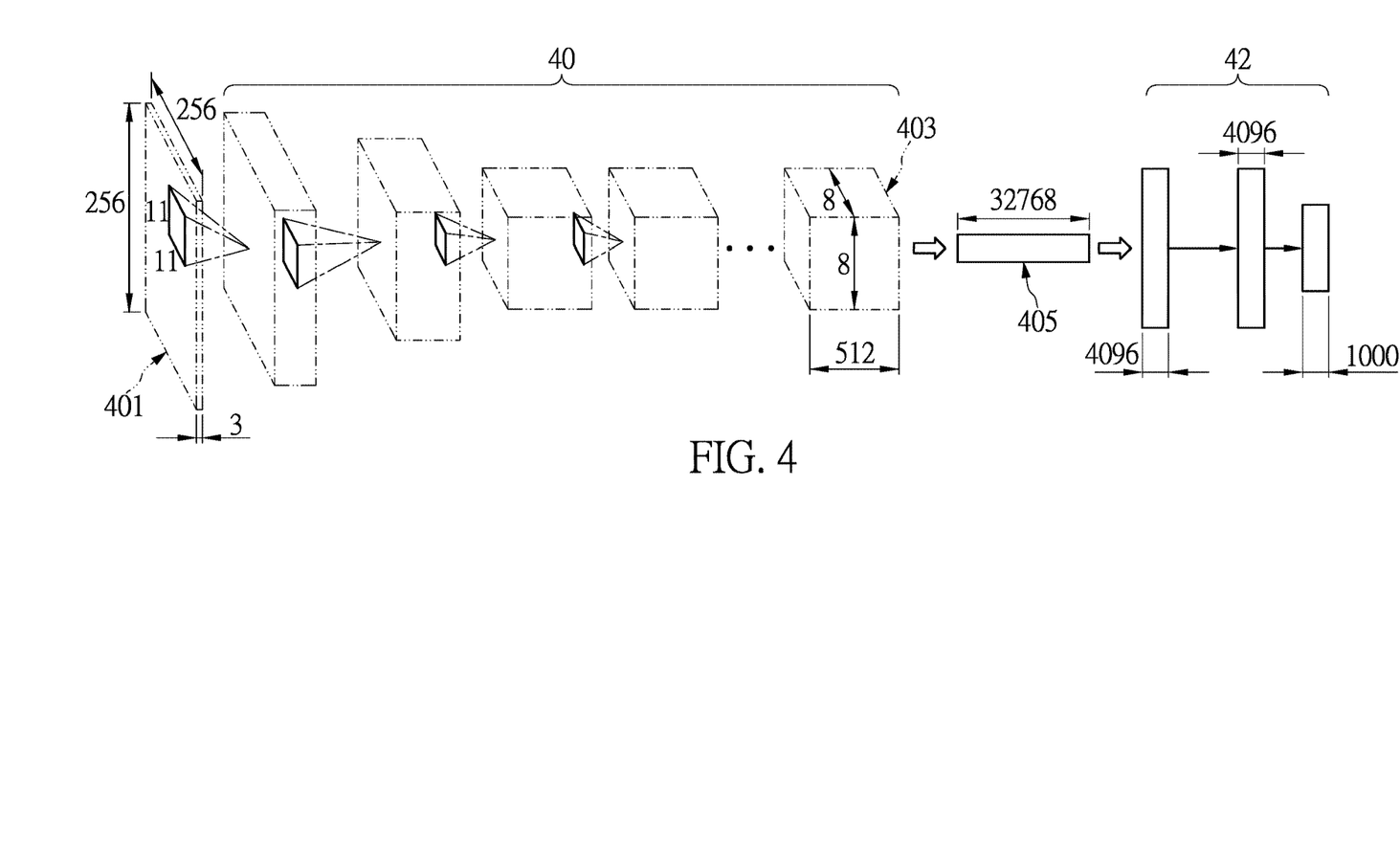
FIG. 4 shows a schematic diagram describing the method for image processing using a fully connected convolutional neural network according to one embodiment of the disclosure.

The schematic diagram depicting the convolution operation shown in FIG. 3 can be applied to the convolution operation 40 of FIG. 4 in the method for image processing using the fully connected convolutional neural network according to one embodiment of the disclosure.

The method of image processing can be applied to any existing neural network in one embodiment of the disclosure. The method allows the existing neural networks to not be limited to the specific image sizes. One of the aspects is that an initial input image 401 may be limited to the same aspect ratio (i.e. length equals to width) as the size "256×256×3" shown in FIG. 4, and is inputted to a fully connected convolutional neural network. In the convolution operation 40, a plurality of number, e.g., 5, of pooling operations are used to downsize the image by 32 times to the size 8×8×512, shown as a feature cube 403. The information involved in the feature cube 403 includes the image features extracted from the input image 401. According to one of the embodiments, an activation function, e.g., Relu function, can be performed so as to obtain one or more shape features of the object by removing the negative values of the input data.

After that, the features involved in the feature cube 403 can be converted to a vector by a flattening operation. The vector is such as a one-dimensional feature value 405 shown in the diagram. In the present example, the one-dimensional feature value 405 is 32768 that is a result by multiplying the values 8, 8 and 512. The one-dimensional feature value 405 is then linked to a fully connected operation 42. In other words, the flattened value is linked to the basic neural network, as shown in FIG. 2, for establishing a convolutional neural network model through a deep-learning process.

In an exemplary example, a fully connected operation 42 is performed in a fully connected layer. The example shows that there are 4096 neurons at the left side, and 4096 neurons at the right side. The neurons at both sides are interconnected for composing features extracted from the image. After multiplying a weight value, there are a total of 4096×4096 lines. The one-dimensional feature value 405 is formed from the input image 401 when it is processed by the convolution operation 40. The one-dimensional feature value 405 is performed by the fully connected operation 42 with the 4096 neurons of the fully connected layer. An output value of the neural network is 1000, for example. In one embodiment of the disclosure, this output value may represent an image classification. The fully connected operation 42 is used to classify the image. In the fully connected neural network, one of the objectives is to obtain more precise image recognition rate through a training of a large amounts of data for classifying the image.

As the above description, when the feature cube 403 is formed by the convolution operation 40, the feature values in the feature cube 403 are converted to a one-dimensional feature value 405. A whole convolutional neural network can be represented by the input image 401 ("256×256×3"), the feature cube 403 ("8×8×512"), the one-dimensional feature value 405 ("32768"), an output of the first fully connected layer ("4096"), an output of the second fully connected layer ("4096") and a last output of the neural network ("1000").

One of the aspects of the present disclosure is that, no matter what size the input image 401 is, the method for image processing using the fully connected convolutional neural network is applicable to any input image as long as the one-dimensional value obtained by flattening the feature cube 403 is the same as the length of the one-dimensional feature value 405 used in the method for image processing in accordance with the present disclosure.

Table 1 shows a lookup table indicative of multiple sizes of reference images applicable to a trained fully connected convolutional neural network. The lookup table is established by a specific number of images with multiple sizes, e.g., aspect ratios, in accordance with a specific one-dimensional feature value. The images with various sizes listed in the lookup table can be adapted to the model trained by the fully connected convolutional neural network no matter whether the ratio of length and width of the input image is required to be fixed. The present example shows that the sizes of the reference image can be 256×256×3, 128×512×3, 64×1024×3, 32×2048×3, 512×128×3, 1024×64×3 or 2048×32×3. All the sizes of the image listed in the lookup table can be used in the method for image processing using fully connected convolutional neural network. The feature cube corresponding to each of the reference images can be formed by convolution operation. The size of feature cube can be 8×8×512, 4×16×512, 2×32×512, 1×64×512, 16×4×512, 32×2×512 or 64×1×512. The same one-dimensional feature value, e.g., 32768, can be obtained and used in training of the convolutional neural network.

TABLE 1

| reference image | feature cube | one-dimensional feature value | first fully connected layer | second fully connected layer |
| --- | --- | --- | --- | --- |
| 256 × 256 × 3 | 8 × 8 × 512 | 32768 | 4096 | 4096 |
| 128 × 512 × 3 | 4 × 16 × 512 | 32768 | 4096 | 4096 |
| 64 × 1024 × 3 | 2 × 32 × 512 | 32768 | 4096 | 4096 |
| 32 × 2048 × 3 | 1 × 64 × 512 | 32768 | 4096 | 4096 |
| 512 × 128 × 3 | 16 × 4 × 512 | 32768 | 4096 | 4096 |
| 1024 × 64 × 3 | 32 × 2 × 512 | 32768 | 4096 | 4096 |
| 2048 × 32 × 3 | 64 × 1 × 512 | 32768 | 4096 | 4096 |

Figure 5:
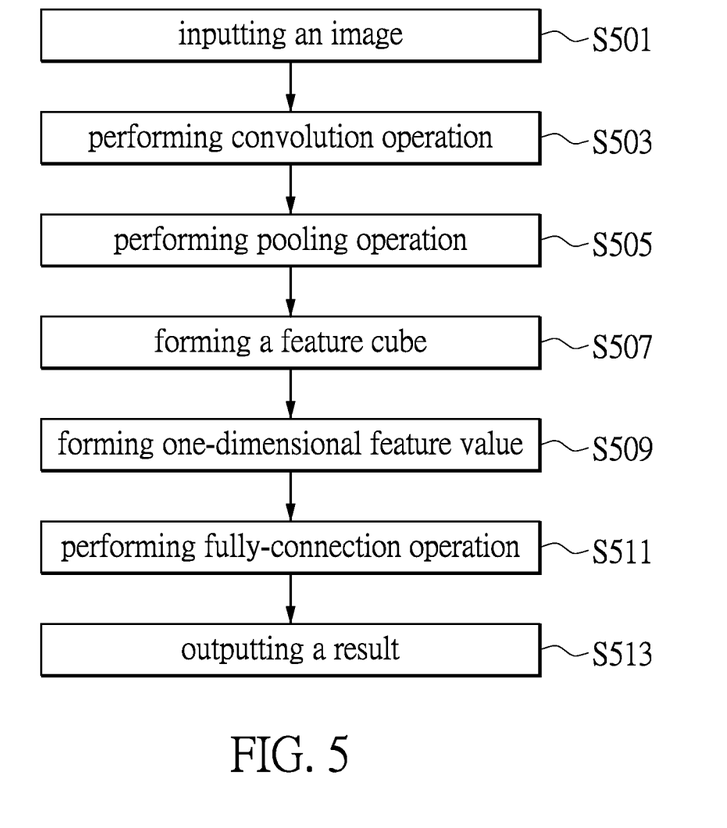
FIG. 5 shows a flow chart describing the method for image processing using the fully connected convolutional neural network in one embodiment of the disclosure.

Reference is made to FIG. 5 showing a flow chart that describes the method for image processing using the fully connected convolutional neural network according to one embodiment of the disclosure.

In the beginning, as shown in step S501, a circuit system receives an input image with an aspect ratio listed in Table 1. The input image complies with one of sizes of references images applicable in the fully connected convolutional neural network. Next, as shown in step S503, the input image is processed by a convolution operation. The convolution operation is performed on the input image with a specific filter. For example, the input image is scanned by a preset stride, and the image values are processed by a multiplication-addition operation with a filter implemented by a convolution core. Each convolution operation can obtain one feature map. The filter is used to extract the features from the image. A Relu function can be used to remove the negative values for filtering out the unused values. In step S505, the convolution operation forms one or more feature maps that are processed by a pooling operation for dimensionality reduction of the data. The dimensionality reduction can maintain the important information of the image. A max-pooling operation may be used to obtain a maximum value of the feature values. One of the objectives of the max pooling operation is to reduce noises without affecting any determination. In step S507, a feature cube with a specific depth is formed.

The pooling operation can effectively reduce the dimension of the feature map so as to form a plurality of feature maps. In step S509, in a flattening process a one-dimensional feature value is formed. As shown in Table 1, the plurality of images applicable to the fully connected convolutional neural network have the same one-dimensional feature value. The one-dimensional feature value indicates a model size. The model size may be restricted by the processing capability of the circuit system. A lookup table including multiple sizes of reference images adapted to the fully connected convolutional neural network is established by multiple images that match the number of model sizes of the one-dimensional feature value. In other words, the images matching the number establish the lookup table including the multiple reference images adapted to the fully connected convolutional neural network. The one-dimensional feature value is then inputted to the fully connected layer. In step S511, a fully connected operation is performed to link the one-dimensional feature value with the basic neural network. In step S513, an output result is outputted. The output result is used to describe the image features.

Table 2 shows another embodiment of the disclosure. An input reference image with a size of 192×192×3 is exemplarily provided. Through a convolution operation, a feature cube with size of 6×6×512 is formed. Through a flattening operation, a one-dimensional feature value with size of 18432 is formed. A weighting parameter for the convolutional neural network can be provided for expanding the method to be applied to any other input image that is able to form the one-dimensional feature value of 18432. According to Table 2, the input reference image applicable to the method can be of a size such as 128×288×3, 96×384×3, 64×576×3, 32×1152×3, 288×128×3 or 1152×32×3

TABLE 2

| reference image | feature cube | one-dimensional feature value | first fully connected layer | second fully connected layer |
| --- | --- | --- | --- | --- |
| 192 × 192 × 3 | 6 × 6 × 512 | 18432 | 4096 | 4096 |
| 128 × 288 × 3 | 4 × 9 × 512 | 18432 | 4096 | 4096 |
| 96 × 384 × 3 | 3 × 12 × 512 | 18432 | 4096 | 4096 |
| 64 × 576 × 3 | 2 × 18 × 512 | 18432 | 4096 | 4096 |
| 32 × 1152 × 3 | 1 × 36 × 512 | 18432 | 4096 | 4096 |
| 288 × 128 × 3 | 9 × 4 × 512 | 18432 | 4096 | 4096 |
| 1152 × 32 × 3 | 36 × 1 × 512 | 18432 | 4096 | 4096 |

Figure 6:
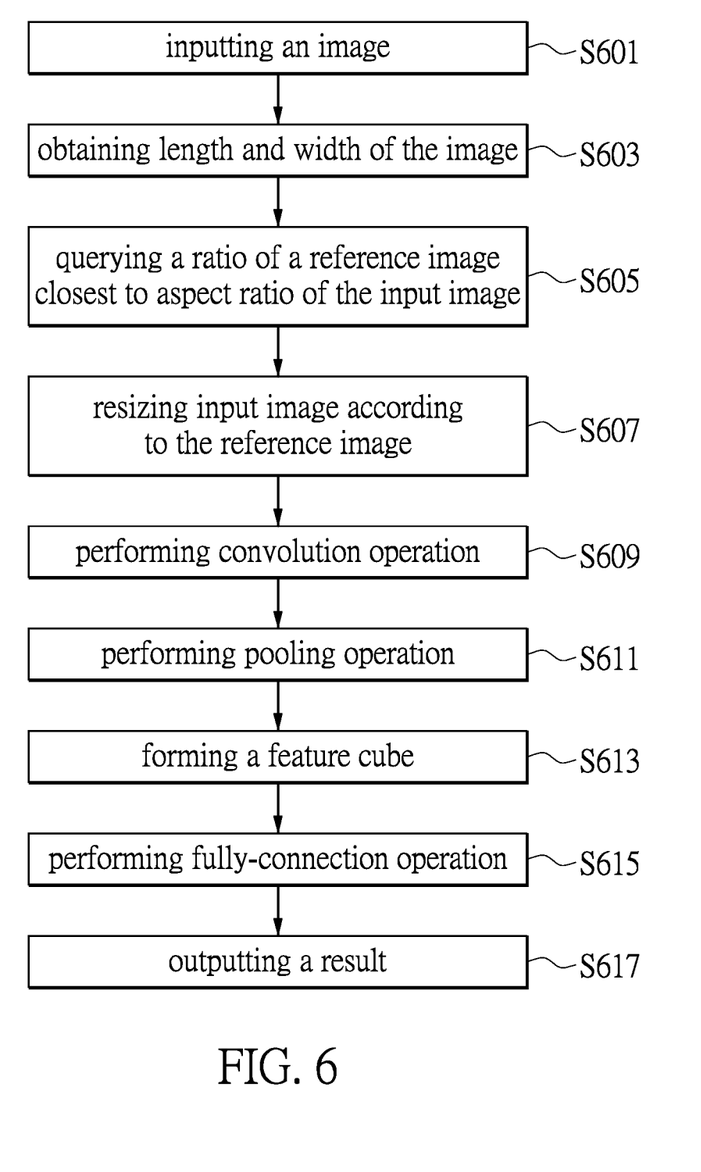
FIG. 6 shows a flow chart describing the method for image processing using the fully connected convolutional neural network in another embodiment of the disclosure.

According to one further embodiment of the disclosure, the method for image processing using fully connected convolutional neural network can flexibly accept the input image listed in Table 1, Table 2 or other similar schemes. Reference is made to FIG. 6, which shows a flow chart describing the method of the disclosure.

In the beginning, such as in step S601, an image is received. In step S603, a length, a width and an aspect ratio of the image can be obtained. In step S605, by querying a lookup table such as shown in Table 1 or Table 2 that records the various aspect ratios of the reference images applicable to the fully connected convolutional neural network, a reference image with the length, the width or the aspect ratio closest to the input image can be obtained. For example, if the size of the input image is 368×1075, the reference image with size of 128×512 in the table is the image closest to the input image. In step S607, the input image is then resized to 128×512 of the chosen reference image. Therefore, the aspect ratio of the input image can be retained as much as possible.

In step S609, the resized input image is used in the convolution operation. In the convolution operation, the resized input image is processed by a multiplication-addition operation that is performed with an appropriate filter. Multiple convolution operations are performed to filter out the image features so as to form a feature map. In step S611, a pooling operation is performed for removing the noises. After that, in step S613, a feature cube is formed. The feature cube can then be processed as a one-dimensional feature value. In step S615, the one-dimensional feature value is inputted to a fully connected layer so as to perform a fully connected operation. Finally, in step S617, a convolutional neural network model (CNN model) is outputted.

It should be noted that the lookup table such as Table 1 or Table 2 can be appropriately adjusted for fitting the CNN model for more sizes of images. The other images can be the images with size of 224×224×3 or bigger. When any input image is resized to a size listed in the lookup table, the input image can apply to the fully connected CNN mode according to the embodiments of the disclosure.

According to the above description of embodiments and the lookup table, the size of the input image applied to the method for image processing is related to the number of factors of an entry image of the fully connected convolutional neural network. The method can be applied to more input images. Table 1 shows an exemplary example that an original image with size of 256×256×3 is downsized by 32 times and becomes a feature cube with size of 8×8×512. In the diagram, the symbol 'H' represents both length and width of the original image and therefore the size of the original image is 'H×H'. After downsizing the original image, many possibilities of sizes for entry images can be obtained. For example, the number of possible sizes of the entry images can be (H/32)*(H/32). In other words, if a numerical value 's' is used as a multiple for dimensionality reduction, the number of applicable sizes of input images can be (H/s)*(H/s). Further, if the system is to be configured to accept more diverse sizes of input images, the images with acceptable sizes can be restricted by the number (H/s)*(H/s).

Figure 7:
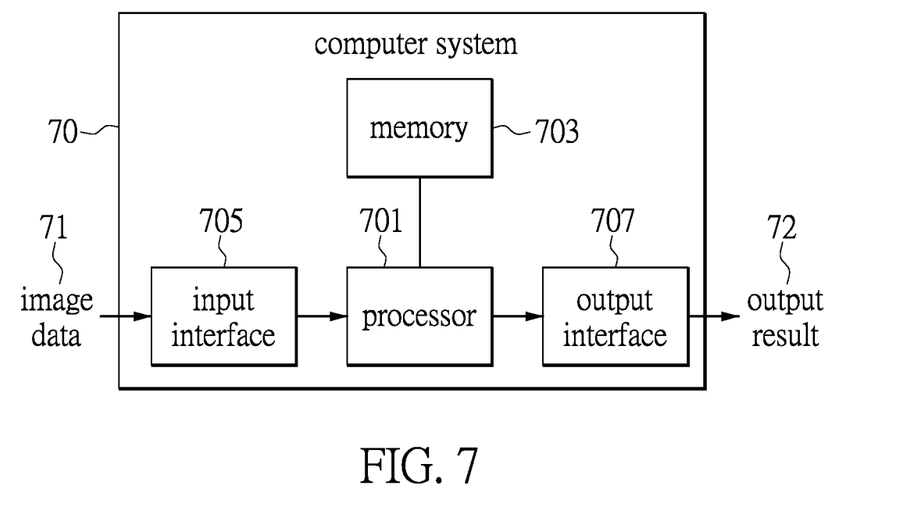
FIG. 7 shows a block diagram depicting the circuit system for operating the method for image processing using the fully connected convolutional neural network according to one embodiment of the disclosure.

The method for image processing described above can be implemented in a circuit system that can be an image-processing chip implemented by an integrated circuit (IC) or a specific application such as an IP Cam. The related CNN model is generally used for image recognition or classification. FIG. 7 shows a block diagram depicting the circuit system in one embodiment of the disclosure.

A computer system 70 including one or more processors (e.g., processor 701) is shown in the diagram. The processor 701 may implement a circuit system that includes some peripheral components such as a memory 703 and an input interface 705 receiving input image data 71. While receiving the image data via the input interface 705, the data is buffered in the memory 703. The data generated through the convolution operation, the pooling operation, the flattening and fully connected operations are also buffered in the memory 703. For example, the feature map, the feature cube and the one-dimensional feature value obtained in the convolution operation can be buffered in the memory 703. An output result 72 is then outputted via an output interface 707.

The processor 701 is used to perform the method for image processing using fully connected convolutional neural network. After receiving the image data 71, an input image or an appropriate image being adjusted is obtained by querying the CNN model. A convolution operation and a fully connected operation are performed on the input image so as to retrieve image features that form an output result 72. The output result 72 can be used to recognize and classify the image.

In summary, while using convolution operation to process the image, an error may occur if the size of input image is not fixed. On the other hand, some more shortcomings may also occur if the image is compelled to be resized to a fixed size, e.g., a square. Therefore, the recognition rate of image may be decreased, the image may not be easily classified, and the characteristic of aspect ratio of the image may be lost. Further, even if the fully connected layer is removed intentionally in the conventional technology, the advantage of the fully connected layer will be lost. Thus, the method for image processing and the circuit system according to the present disclosure are provided to improve on the related art due to a preset lookup table recording various sizes of reference images being used in the fully connected neural network according to the present disclosure. The method allows the conventional neural network to accept more input images with various aspect ratios, and can substantially retain the aspect ratio characteristics of the original image for image classification and recognition.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for image processing using a fully connected convolutional neural network, comprising:
   receiving an image that matches one of a plurality of preset sizes of reference images adapted to the fully connected convolutional neural network, wherein the preset sizes of the reference images have different aspect ratios of lengths and widths;
   performing a plurality of convolution operations on the image so as to form a feature cube;
   performing a flattening operation on the feature cube to convert the feature cube into a one-dimensional feature value having a length as the same as lengths of one-dimensional feature values of the reference images that are obtained by performing the plurality of convolution operations and the flattening operation on the reference images;
   inputting the one-dimensional feature value to a fully connected layer for performing a fully connected operation; and
   generating an output value of the fully connected convolutional neural network.

2. The method according to claim 1, wherein the feature cube includes image features extracted from the image, and an activation function is performed on the image features for obtaining shape features of one or more objects in the image.

3. The method according to claim 1, wherein the convolution operation is performed to form one or more feature maps; and a pooling operation is performed to reduce dimensionality while retaining important information of the image.

4. The method according to claim 1, wherein the fully connected layer includes multiple neurons, and the neurons are interconnected for combining into features extracted from the image.

5. The method according to claim 4, wherein the output value of the fully connected convolutional neural network is used to identify or classify the image.

6. The method according to claim 1, wherein the one-dimensional feature value includes a number of model sizes, and a lookup table including multiple sizes of reference images adapted to the fully connected convolutional neural network is established by multiple images that match the number of model sizes of the one-dimensional feature value.

7. A method for image processing using a fully connected convolutional neural network, comprising:
   receiving an image and obtaining a length, a width and an aspect ratio of the image;
   querying a lookup table that is established based on a plurality of preset sizes of reference images adapted to the fully connected convolutional neural network, and obtaining a reference image with a length, a width and an aspect ratio that are closest to the image, wherein the preset sizes of the reference images have different aspect ratios of lengths and widths;

resizing the image to match the size of the reference image;

performing a plurality of convolution operations on the image so as to form a feature cube;

performing a flattening operation on the feature cube to convert the feature cube into a one-dimensional feature value having a length as the same as lengths of one-dimensional feature values of the reference images that are obtained by performing the plurality of convolution operations and the flattening operation on the reference images;

inputting the one-dimensional feature value to a fully connected layer for performing a fully connected operation; and generating an output value of the fully connected convolutional neural network.

8. The method according to claim 7, wherein the feature cube includes image features extracted from the image, and an activation function is performed on the image features for obtaining shape features of one or more objects in the image.

9. The method according to claim 7, wherein the convolution operation is performed to form one or more feature maps; and a pooling operation is performed to reduce dimensionality while retaining important information of the image.

10. The method according to claim 7, wherein the fully connected layer includes multiple neurons, and the neurons are interconnected for combining into features extracted from the image.

11. The method according to claim 10, wherein the output value of the fully connected convolutional neural network is used to identify or classify the image.

12. The method according to claim 7, wherein the one-dimensional feature value includes a number of model sizes, and a lookup table including multiple sizes of reference images adapted to the fully connected convolutional neural network is established by multiple images that match the number of model sizes of the one-dimensional feature value.

13. A circuit system, comprising:
one or more processors electrically connected to a memory and performing a method for image processing using a fully connected convolutional neural network, wherein the method is operated in the fully connected convolutional neural network, comprising:
receiving an image via an input interface so as to obtain a length, a width and an aspect ratio of the image;
querying a lookup table that is established based on a plurality of preset sizes of reference images adapted to the fully connected convolutional neural network, and obtaining a reference image with a length, a width and an aspect ratio that are closest to the image, wherein the preset sizes of the reference images have different aspect ratios of lengths and widths;

resizing the image to match the size of the reference image;

performing a plurality of convolution operations on the image so as to form a feature cube;

performing a flattening operation on the feature cube to convert the feature cube into a one-dimensional feature value having a length as the same as lengths of one-dimensional feature values of the reference images that are obtained by performing the plurality of convolution operations and the flattening operation on the reference images;

inputting the one-dimensional feature value to a fully connected layer for performing a fully connected operation; and generating an output value of the fully connected convolutional neural network.

14. The circuit system according to claim 13, wherein the feature cube includes image features extracted from the image, and an activation function is performed on the image features for obtaining shape features of one or more objects in the image.

15. The circuit system according to claim 13, wherein the convolution operation is performed to form one or more feature maps; and a pooling operation is performed to reduce dimensionality, while retaining important information of the image.

16. The circuit system according to claim 13, wherein the fully connected layer includes multiple neurons, and the neurons are interconnected for combining into features extracted from the image.

17. The circuit system according to claim 13, wherein the one-dimensional feature value includes a number of model sizes and the model size is limited by processing capability of the circuit system; and the lookup table is established by multiple images that match the number of model sizes of the one-dimensional feature value.

* * * * *